June 4, 1929.  E. L. KUNZE  1,716,353
SHUTTLE DRIVER FOR LOOMS
Filed Nov. 17, 1927
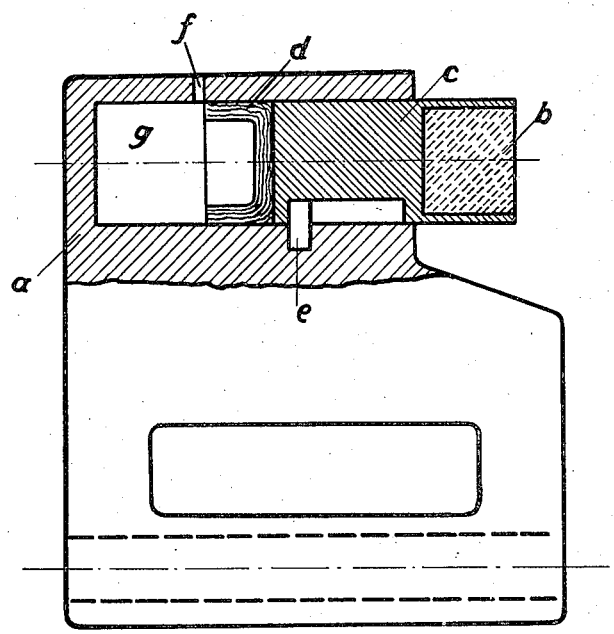
INVENTOR
Ernst Ludwig Kunze
By Chaturs Company
Attys Patented June 4, 1929.

1,716,353

UNITED STATES PATENT OFFICE.

ERNST LUDWIG KUNZE, OF CHEMNITZ, GERMANY.

SHUTTLE DRIVER FOR LOOMS.

Application filed November 17, 1927, Serial No. 233,999, and in Germany November 20, 1926.

It is known to effect the snap stroke of the shuttle by means of a slidable piston by which air is compressed.

These catch devices are rigidly connected with the loom. In order to move the piston back again into its initial position, whereby it is only possible that an air cushion can exist on the rearward movement of the piston, it is necessary to use a spring or a special device (compressor). Through the heavy blows following one another at short intervals a spring is soon fatigued and the spring action slackened, so that the piston is no longer moved back into its initial position. The device can then no longer fulfil its purpose. A compressor appliance is very costly and complicates the plant.

The invention deals with the fact that the driver is formed in a special manner. It utilizes a mechanical property of the piston based on the to and fro motion of the driver thereby imparting to the whole device a substantial technical advance. The piston is slidably arranged in the driving member. Due to the inertia of the piston when struck this is always brought back again into its initial position without the use of special means, the air which escapes being automatically again drawn in. The elastic air cushion, which is absolutely necessary for the attainment of the special advantage of this driver is automatically renewed in an infallible manner.

In the accompanying drawing the invention is illustrated in one constructional form by way of example.

In the driving member $a$ is slidably arranged the piston $c$ provided with an elastic insertion $b$. By the leather washer $d$ which is secured to the piston $c$ in suitable manner the latter is caused to make an air-tight closure with the driving member. A cross piece $e$ limits the stroke of the piston, and an opening $f$ serves for the suction of air.

The manner of operation is as follows; upon a stroke of the shuttle, the driver is struck against the shuttle with the piston $c$. The latter is thereby moved rearwardly and compresses the air in space $g$. Upon this backward stroke of the piston, the leather washer $d$ closes the opening $f$ and no air can escape. If now the driver is moved back by the striker into its initial position on the wall of the shuttle box, the piston is moved forwardly on account of its inertia and frees the opening $f$ through which air is again drawn in.

I claim:—

In a shuttle driver for looms having a recess, in combination, a piston mounted with capability of reciprocation in said recess, a catch carried by the body of the shuttle driver for limiting the movements of said piston, an air vent in the side of said recess, a U-shaped washer secured to the inner end of said piston, an elastic insertion carried by the outer end of said piston the arrangement being such that the air vent is covered by the washer when the shuttle driver strikes the shuttle.

ERNST LUDWIG KUNZE.